UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

1,393,739.     Specification of Letters Patent.     Patented Oct. 18, 1921.

No Drawing.     Application filed January 16, 1919. Serial No. 271,489.

*To all whom it may concern:*

Be it known that we, RAYMOND C. BENNER and HARRY F. FRENCH, citizens of the United States, and residents, respectively, of Fremont, in the county of Cuyahoga and State of Ohio, and Fremont, in the county of Cuyahoga and State of Ohio, have invented a certain new and useful Improvement in Electric Batteries, of which the following is a full, clear, and exact description.

This invention relates to electric batteries and although particularly applicable to dry cells, it will be apparent from the following description that the improvements can also be incorporated in wet batteries in a slightly modified manner.

In the usual form of dry cell a paste, generally made from flour or other farinaceous material, water and zinc chlorid, is placed adjacent the zinc container electrode. This is done in various ways according to the construction of the cell. Where a bibulous paper lining is inserted between the zinc can and mix, the paste is usually applied to the outside of the lining, but in bag type cells the paste fills the space between the cartridge and zinc container. The principal purpose of the paste is to improve the shelf life or to decrease deterioration. This deterioration as a rule is due to local action or corrosion of the zinc, and one of the objects of the present invention is to eliminate the use of paste by otherwise decreasing corrosion.

The use of the paste is not only undesirable from a manufacturing standpoint, on account of the difficulty of manipulating the pasted linings, but is also disadvantageous because of the difficulty at times in obtaining flour for such purposes, especially wheat flour, in times of food scarcity. Our invention must not, however, be understood as limited to non-paste cells, as the decreasing of local action and corrosion is desirable even with the paste construction.

It is well known that the amalgamation of the zincs with mercury decreases local action, but mercury is expensive and sometimes hard to obtain in sufficient quantities. According to this invention the corrosion is decreased by the use of other materials, so that the amount of mercury may be decreased, or if necessary, entirely eliminated.

Since corrosion is an especially important factor on light current drains and a relatively less important factor on heavy current drains, the invention is especially applicable to cells intended for light service over extended periods.

The invention consists in the use of bismuth in various ways to decrease corrosion. One method of applying the invention to dry cells of the ordinary paste type consists in mixing a bismuth compound in the paste. With a dry cell having a chlorid electrolyte such as a combination of zinc chlorid and ammonium chlorid, a carbon electrode and a mix of manganese peroxid and carbon, bismuth chlorid ($BiCl_3$) is preferable, although bismuth oxid or other bismuth compounds could be used which have no inherent defects when considered in connection with the other chemical ingredients of the cell. The bismuth of the bismuth chlorid or oxid is replaced by some of the zinc of the container electrode to form the corresponding zinc salt. The bismuth plates out or alloys with the zinc. It is difficult to set forth suitable proportions or amounts of bismuth to be used, as the amount of paste varies, but it may be stated that in a 2½x6 inch dry cell the amount of bismuth is preferably considerably under one gram, that is, the effect is produced by relatively minute quantities. With a non-paste cell construction a similar result would be obtained by applying bismuth chlorid to the surface of the lining adjacent the zinc.

Another method of using the bismuth, which permits the elimination of the paste in the type of cell previously referred to, consists in plating bismuth on the zinc in any well known manner. This may be done, for example, by first cleaning the inside of the can by means of a mixture of chromic and sulfuric acids and then plating by filling with a solution of bismuth chlorid in an electrolyte containing zinc chlorid and ammonium chlorid, or a solution of bismuth nitrate acidified with acetic acid. It will also be understood that other methods of bismuth plating could be used involving either chemical or electrolytic reactions. The actual amount of bismuth plated on the zinc in this case is relatively small, but in any case the zinc will be exposed to the plating process for a sufficient time to permit the active surface of the zinc to be entirely coated with bismuth.

An amalgam of bismuth and mercury may also be formed on the zinc by plating or in other ways. It seems to make little difference in the action whether the bismuth or mercury is first plated on the zinc, or whether they are simultaneously or alternately plated on the electrode.

In all of the previous cases paste could be used without deleterious action, but it will be understood that one of the important features of the invention is to eliminate the necessity for the use of the paste. The same is true in regard to saving of mercury, but it is not especially desired to entirely eliminate this material, as it has been found that bismuth and mercury may be used together without destroying the action of either.

The invention may be applied in a substantially analogous manner to wet batteries, especially the Lalande copper oxid type, having zinc electrodes and caustic soda electrolyte. As no paste or similar material is used between the zinc and copper oxid, the first method previously set forth would of course be impossible, but the bismuth compound, such as the oxid or hydroxid, could be placed in the electrolyte and would plate out on the zinc. On account of the large volume of electrolyte, considerable bismuth compound would be necessary, and this method is not very practical for various reasons which need not be fully set forth.

A better manner of utilizing the effect of bismuth consists in casting the bismuth in the zinc plate. As the zinc is generally cast for such batteries this method may be carried on more readily than in the case of dry cells using sheet zinc. In general, however, the bismuth is plated on the zinc or the zinc alloyed with mercury by the methods previously referred to, although both the mercury and bismuth could be plated on the zinc in the same manner as applied to the sheet zinc.

Having described our invention, what we claim is:—

1. In electric batteries, a negative electrode of zinc having bismuth material associated therewith.

2. In electric batteries, a negative electrode of zinc having bismuth material associated with the active surface thereof.

3. In electric batteries, a negative electrode of zinc having a coating of bismuth material on the active surface.

4. In electric batteries, a negative electrode of zinc having mercury and bismuth material associated therewith.

5. In electric batteries, a negative electrode of zinc having mercury associated therewith and a coating of bismuth material on the active surface.

6. In electric batteries, a negative electrode of zinc having mercury and bismuth material associated with the active surface.

7. In electric batteries, a negative electrode of zinc having bismuth chlorid associated with the active surface.

8. In electric batteries, a negative electrode of zinc, a bibulous substance adjacent the zinc and bismuth chlorid associated with the adjacent surfaces of the zinc and bibulous substance.

9. In electric batteries, a positive electrode, a mix containing manganese peroxid and carbon associated with an electrolyte containing chlorids, and a negative electrode of zinc having a layer of bismuth material adjacent the active surface of said zinc.

10. In electric batteries, a positive electrode, a mix containing manganese peroxid and carbon associated with a chlorid electrolyte, a bibulous substance adjacent the mix and a negative electrode of zinc having a layer of bismuth material between the active surface of the zinc and the bibulous substance.

In testimony whereof, we hereunto affix our signatures.
RAYMOND C. BENNER.
HARRY F. FRENCH.